Jan. 4, 1949.  R. W. HURSH  2,457,899
VANED TIRE
Filed Dec. 31, 1943  2 Sheets-Sheet 1
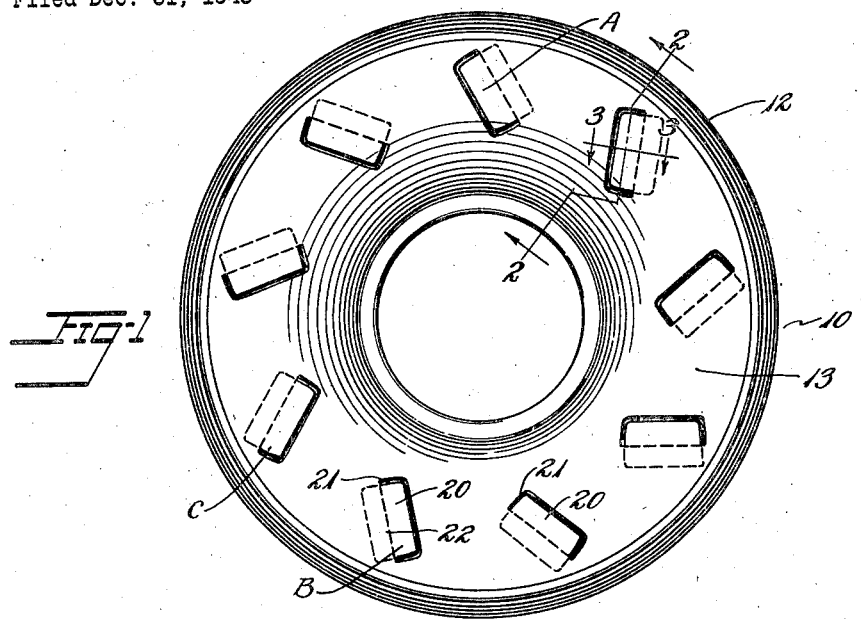
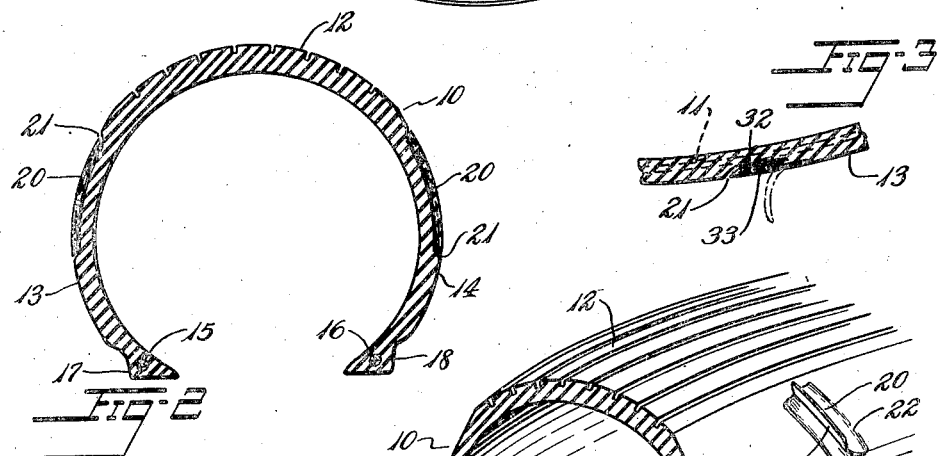
Inventor
Robert W. Hursh
By Willis F. Ivory
Atty.

Jan. 4, 1949.  R. W. HURSH  2,457,899
VANED TIRE
Filed Dec. 31, 1943  2 Sheets-Sheet 2
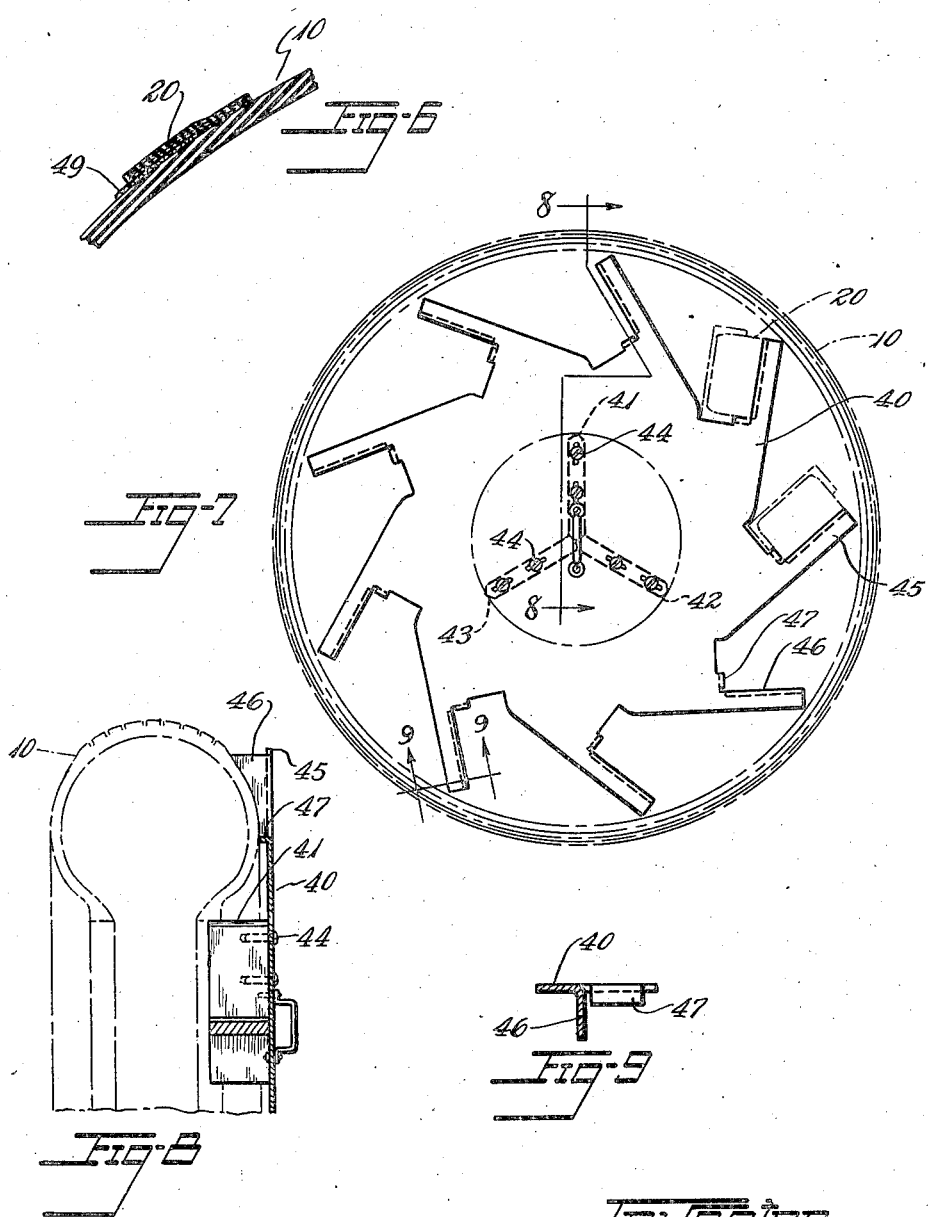

Patented Jan. 4, 1949

2,457,899

UNITED STATES PATENT OFFICE 2,457,899

VANED TIRE

Robert W. Hursh, Akron, Ohio, assignor to The B. F. Goodrich Company, New York, N. Y., a corporation of New York Application December 31, 1943, Serial No. 516,449

11 Claims. (Cl. 244—103)

This invention relates to vaned tires and is especially useful in providing prerotation of the wheels of aircraft to avoid excessive tire wear in landing and to reduce the shock of the landing.

Objects of this invention are to provide an improved tire utilizing the principle of hinged vanes for prerotation, and especially to provide for improved action of the vanes and to provide an improved construction.

Other objects are to provide more rapid acceleration of rotation of the wheel, to provide improved reinforcement of the vanes, to provide security of attachment of the vanes, to provide for more effective hinging of the blades about a curved tire surface, and to provide facility of manufacture.

These and other objects will appear from the following description and the accompanying drawings.

Of the drawings:

Fig. 1 is a side elevation of a tire casing constructed in accordance with and embodying the invention.

Fig. 2 is a cross section thereof taken on line 2—2 of Fig. 1.

Fig. 3 is a cross section thereof, taken on line 3—3 of Fig. 1 showing the relaxed or closed position of one of the vanes in full lines and the stressed or open position of the vane in dot and dash lines.

Fig. 4 is a perspective view of a portion of the tire showing one of the vanes in its stressed or open position.

Fig. 5 is a detail view of the side of the tire at a stage in the manufacture thereof, showing a vane applied thereto, parts being broken away to show the construction.

Fig. 6 is a section thereof, taken on line 6—6 of Fig. 5.

Fig. 7 is a plan view of a template used in positioning the vanes, the position of the tire being indicated in dot and dash lines.

Fig. 8 is a cross sectional view thereof, taken on line 8—8 of Fig. 7, parts being broken away.

Fig. 9 is a cross-section thereof, taken on line 9—9 of Fig. 7.

Referring to the drawings, the numeral 10 designates an airplane tire casing having a body of rubberized textile material and preferably of cord construction enclosed by rubber or other rubber-like material providing a ribbed tread portion 12 and side wall portions 13, 14. The reinforcing cords, indicated at 11 in Fig. 3, may be anchored in the usual manner about annular bead cores 15, 16 at the bead portions 17, 18 of the tire which are adapted to be seated on the usual channel rim. An inner tube (not shown) may be incorporated in the casing for inflation of the tire.

For effecting rotation of the tire about its axis during flight of the aircraft, a plurality of flexible vanes 20 are provided preferably on each side of the tire. While good results have been obtained with nine vanes as shown, fewer or more vanes than this may be used, if desired. Each vane when relaxed is seated in a pocket 21 provided in the sidewall of the tire and is hinged along one margin 22 of the vane to the body of the tire, being free along its other margins 23, 24, 25. The free margins 23, 24 and 25 are tapered from the inner face of the vane to a thin edge at the outer face, and the margins of the pocket 21 adjacent thereto are sloped correspondingly to provide a fit about the vane which in its relaxed position is seated in the pocket with its outer face flush with the side wall of the tire and preferably with a thin space between the vane and the wall of the pocket at all points for entrance of air.

For providing flexibility and strength of the vane 20 and to facilitate its hinging about its margin 22, which in the tire section is curved, while permitting distortion thereof to permit bending action and to return elastically the stressed vanes to their pockets, such vane is reinforced by one or more layers of weftless parallel cords, such as the layers 30, 31, as shown in Fig. 5, in which the cords are preferably disposed approximately perpendicular to the hinge margins 22 of the vane and are separated by a web of elastic rubber or other rubber-like material from each other permitting them to spread resiliently in fan-like manner during hinging movement to the open position. While the cords in the layers are preferably laid parallel to each other for providing the greatest fan-wise elasticity, a substantial elasticity with greater reinforcement may be obtained by arrangement of the cords of one layer parallel to each other and at a slight angle with respect to the cords of another layer. Although it is preferred to arrange the cord layers with their cords perpendicular to the hinge line, if desired in some cases the cords may be disposed at other angles to the hinge line. It will usually be advantageous however to arrange the cords to cross the hinge line.

The inner face 32 and the outer face 33 of each vane, are of resilient rubber or other rubber-like material and these layers are united to each other between the cords and about the free margins of the vane by molding to completely enclose and protect the reinforcing cords from entrance of moisture. The rubber-like material of the side walls 13 and 14 extends over the exposed floors of the pockets to protect the cord structure of the tire and is merged with the coverings 32, 33 to completely seal out the moisture and provide a smooth covering integrally united with the tire casing and fully molded faces of the vanes.

The vanes may be arranged with their hinged margins oblique at the position of attachment of the vanes to radial planes including the axis of rotation of the tire, or in other words with their hinge lines intersecting radii of the wheel. Good results have been achieved by arranging the vanes as shown in Fig. 1, where the radially innermost free corners of the vanes are most advanced with respect to the direction of rotation of the tire. Among the advantages of this oblique disposition of the hinged margins of the vanes as shown in Fig. 1, this disposition has the advantage that centrifugal force acts on the vane to assist in holding it open, this being of value especially at the higher tire speeds owing to the reduction of relative speed of the air with respect to the vanes.

The vanes raise from the side wall of the tire as the air passes the lower quadrants of the tire in a direction from right to left of Fig. 1, due to movement of the tire bodily from left to right through the air. With this arrangement, vanes such as A and others in the upper portion of the tire lie flat against the side wall 13, whereas vanes such as B and others in the lower portion of the tire are raised from the side wall into the air flow where they act to cause clockwise rotation of the tire about its axis (Fig. 1). With this construction the greatest turning moment is exerted in the trailing lower quadrant occupied by vanes such as B and C, Fig. 1. Observations have indicated that the trailing lower quadrant of the wheel is subject to the most advantageous action of the air flow for the development of maximum turning torque, apparently as a result at least to some extent of the nature of the air flow over the tire shape. In this trailing lower quadrant the vanes, with their inclination as shown in Fig. 1, reach positions more nearly perpendicular to the direction of the air flow for most effective action.

If desired as an alternative construction, an arrangement of the vanes at angles such that their radially outermost free corners are advanced with respect to their innermost free corners, or with their hinge lines inclined oppositely with respect to radii of the tire from that shown in Fig. 1, will provide the greatest turning moment in the leading lower quadrant.

The arrangement of the vanes oblique to radii of the tire tends to decrease resistance to hinging of the vanes due to convexity of the side walls of the tire which supports them, as the diagonal positioning of the hinge line makes that line more nearly approach a straight line and therefore reduces the amount of distortion of the vanes fanwise during their hinging movements. The arrangement also makes it possible for lifting of the vanes into the air stream to start at one free corner and occur progressively toward the other free corner. The narrow space at the free margins of each vane facilitates entry of the air for prompt lifting.

In manufacturing the tire of the invention the procedure and equipment hereinbelow described promote convenience and the production of a uniformly high quality product. The materials comprising the reinforcing plies of cord of the tire body, the bead cores, and the tread and side walls of rubber or other rubber-like material are assembled about a building form in the usual manner of building a tire according to the flat band or drum-building method or other suitable method. The tire may then be formed or expanded by means of a vacuum forming box or other forming means to approximate tire shape and an expansible curing bag mounted therein.

After forming, but before vulcanization, the side walls are cleaned from foreign matter by use of solvents and brushing. A template 40, illustrated in Figs. 7 to 9, is then applied to a side wall of the tire. This template is a disc of sheet metal having three radially adjustable locating jaws 41, 42, 43 mounted on one face thereof and positioned to extend radially of the disc at equally spaced angles from its center. The jaws may be adjusted radially of the disc and locked thereto by screws 44 so as to engage within the bead portion of the tire to locate the template centrally thereof. The template is provided about its periphery with arms 45 in a number corresponding to the number of vanes desired, which arms extend angularly in the plane of the disc with respect to radii thereof, the angle corresponding to the desired angle of the vanes. Each arm has a pair of flanges 46, 47 turned axially of the disc and shaped to rest against the side wall of the tire. The flanges serve to position one side margin and one end margin of the vane.

The vanes 20 are separately constructed by cutting to shape and assembling the two layers 30, 31 of parallel rubberized cords with an outer layer 33, an inner layer 32 and an intervening layer 48 of unvulcanized rubber-like material. For preventing vulcanization of the vane to the tire except along one margin thereof while the vanes are molded in situ on the tire, a separating material 49 which may be a strip of Holland cloth, parchment paper, metal foil or other suitable adhesion-preventing substance is applied to the inner face of the vane with one margin of the material in the case of a strip at the desired hinge line and the other margins extending beyond the margins of the vane. For reinforcing the vane at its hinge line and to secure the separating strip thereto, a strip 50 of unvulcanized gum is folded about the margins of the separating strip at the hinge line.

The assembled vane material and separating strip are laid on the cleaned tire side wall against the template with the separating strip between the side wall and that portion of the vane which is not to be adhered, and is stitched in place. A thin narrow gum strip may be adhered in overlapping relation about the attached margins of the vane extending slightly over the side wall to prevent entry of dust. After the vanes have all been positioned on one side of the tire, the tire is turned over and vanes applied to the opposite side in similar manner. As the vanes on opposite sides of the tire are to be inclined in the same direction of rotation, a similar template of opposite hand is provided for applying the vanes on the opposite side of the tire.

After the vanes are positioned on the tire, the tire with the assembled vanes is painted or dusted with soapstone or other material to prevent adhesion to the mold, and the tire is placed in a mold and cured under internal pressure and applied heat. During vulcanization, the vanes are embedded in the side wall and united integrally therewith, and molded to shape in situ to provide a flush outer surface, and the material of the tire side walls becomes depressed to accommodate the vane. The Holland cloth or other separating material is also depressed so that its margins adjacent the free margins of the vane are bowed outwardly, thereby forming a smoothly rounded depression margin and tapering the free margins of the vane to sharp thin edges while at the same time providing a slight spacing between the vane and side wall for ready entrance of air and while molding the separated faces of the tire and vane to final form.

After vulcanization, the separating strip are removed from the tire and the tire is ready for use.

While it is preferred to employ separating strips of Holland cloth or other sheet material a separating layer may be provided by a coating of lacquer, soapstone, or other separating material applied as a liquid or dust.

Variations may be made without departing from the scope of the invention as it is defined by the following claims.

I claim:

1. A tire comprising an annular body having a side wall comprising rubber-like material, and vanes comprising rubber-like material integral with said side wall at spaced-apart positions thereabout providing resilient, hinged connections with said side wall, the hinge lines of said vanes being each inclined at the position of connection to a radial plane which includes the axis of rotation of the tire, each vane having reinforcing weftless elements extending across the hinge line, said elements being separable laterally with respect to one another under resilient restraint of said rubber-like material.

2. A tire comprising an annular body having a side wall comprising rubber-like material integral with said side-wall at spaced apart positions thereabout providing resilient hinged connections with said side wall, the hinge line of each vane being inclined to a radial plane which includes the axis of rotation of the tire at the position of connection, each vane having weftless reinforcing elements extending across the hinge line substantially normal thereto, said elements being separable laterally with respect to one another under resilient restraint of said rubber-like material.

3. A tire comprising an annular body having a side wall comprising rubber-like material, and flexible vanes integral with said side wall at spaced-apart positions thereabout providing hinged connections with said sidewall, each vane being hinged along a line inclined at the position of attachment to a radial plane including the axis of rotation of the tire and having a free margin inclined in the same general direction as the hinge line.

4. A tire comprising an annular body having a side wall comprising rubber-like material, and flexible vanes integral with said side wall at spaced-apart positions thereabout providing hinged connections with said side wall, each vane being hinged along a line inclined at the position of attachment to a radial plane including the axis of rotation of the tire and having its hinged connection at one margin thereof to said side wall, the other margins of the vane being free of attachment.

5. Means for effecting rotation of a structure in flight comprising an annular body having a wall comprising rubber-like material, and flexible vanes integral with said wall at spaced-apart positions thereabout providing hinged connections to said wall, each vane being hinged along a line obliquely intersecting at the position of attachment an axis-including plane of the body with the end of the hinge line nearest the bead portion of the tire being more advanced in the direction of rotation of the tire than the end nearer the tread of the tire.

6. A tire comprising an annular body having a side wall comprising rubber-like material, and flexible vanes integral with said side wall at spaced-apart positions thereabout providing hinged connections with said side wall, each vane being hinged along a margin thereof inclined to a radius of the tire at the position of attachment with the end of the hinge line nearest the bead portion of the tire being more advanced in the direction of rotation of the tire than the end nearer the tread of the tire.

7. A tire comprising an annular body having a side wall comprising rubber-like material, and flexible vanes on said side wall at spaced-apart positions thereabout, each vane being hinged to said side wall along a margin thereof with the end of the hinge line nearest the bead portion of the tire being more advanced in the direction of rotation of the tire than the end nearer the tread of the tire.

8. A tire comprising an annular body having a side wall of reinforcing material and a covering of rubber-like material thereover, said covering being formed with depressions at spaced-apart positions thereabout, flexible vanes of rubber-like material each occupying one of said depressions in its relaxed position and being hingedly attached along one margin to said side wall with its hinge line of attachment inclined to a radius of the tire at the position of attachment with the end of the hinge line nearest the bead portion of the tire being more advanced in a direction of rotation of the tire than the end nearer the tread of the tire.

9. A tire comprising an annular body having a side wall of reinforcing material and a covering of rubber-like material thereover, said covering being formed with depressions at spaced-apart positions thereabout, flexible vanes of rubber-like material each occupying a said depression in its relaxed position and being hingedly attached along one margin to said side wall with its hinge line of attachment inclined to a radial plane including the axis of rotation of the tire at the position of attachment, said vane being reinforced by elements extending across said hinge line.

10. A tire comprising an annular body having a side wall of textile material and a covering of rubber-like material thereover, said covering being formed with depressions at spaced-apart positions thereabout, flexible vanes of rubber-like material each substantially filling one of said depressions in its relaxed position and being hinged along one margin to said side wall with its hinge line of attachment inclined to a radial plane including the axis of rotation of the tire at the position of attachment, said vane being reinforced by parallel cords extending across said hinge line, said hinge line being curved to conform to said side wall, and elastic material separating said cords and permitting divergent fan-wise disposition of said cords during a hinging movement.

11. A tire comprising an annular tire body having a side wall, and flexible vanes on said wall at circumferentially spaced-apart positions thereabout, each vane being mounted on said side wall for hinging movement of said vane with the end of the hinge line of the vane nearest the bead portion of the tire disposed more advanced in the direction of rotation of the tire than the end of said line nearer the tread of the tire.

ROBERT W. HURSH.

REFERENCES CITED

The following references are of record in the file of this patent:

UNITED STATES PATENTS

| Number | Name | Date |
|---|---|---|
| 1,287,429 | Price | Dec. 10, 1918 |
| 1,833,019 | Faucher | Nov. 24, 1931 |
| 1,992,665 | Hazell | Feb. 26, 1935 |
| 2,264,923 | Waseige | Dec. 2, 1941 |
| 2,333,447 | Schippel | Nov. 2, 1943 |